United States Patent
Tang

(10) Patent No.: US 11,395,287 B2
(45) Date of Patent: Jul. 19, 2022

(54) METHOD FOR BLIND DETECTION OF PHYSICAL DOWNLINK CONTROL CHANNEL AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE COMMUNICATIONS CORP., LTD., Guangdong (CN)

( * ) Notice: Subject to any disclaimer, the term of this patent is extended or adjusted under 35 U.S.C. 154(b) by 39 days.

(21) Appl. No.: 16/990,135

(22) Filed: Aug. 11, 2020

(65) Prior Publication Data
US 2020/0374845 A1    Nov. 26, 2020

Related U.S. Application Data

(63) Continuation of application No. PCT/CN2018/076771, filed on Feb. 13, 2018.

(51) Int. Cl.
*H04W 4/00*    (2018.01)
*H04W 72/04*   (2009.01)
(Continued)

(52) U.S. Cl.
CPC ......... *H04W 72/042* (2013.01); *H04L 1/0038* (2013.01); *H04L 25/0238* (2013.01)

(58) Field of Classification Search
None
See application file for complete search history.

(56) References Cited

U.S. PATENT DOCUMENTS 8,139,535 B2    3/2012  Hsuan
9,167,510 B2   10/2015  Fu et al.
(Continued)

FOREIGN PATENT DOCUMENTS

CN    101790190 A    7/2010
CN    101925109 A   12/2010
(Continued)

OTHER PUBLICATIONS

International Search Report in the international application No. PCT/CN2018/076771, dated Oct. 29, 2018.
(Continued)

*Primary Examiner* — Clemence S Han
(74) *Attorney, Agent, or Firm* — Perkins Coie LLP

(57) ABSTRACT

Embodiments of the disclosure relate to a method for blind detection of a PDCCH and a terminal device. The method includes: when the number of PDCCH blind detections in at least one search space of a terminal device is greater than a maximum number of blind detections, the terminal device reduces the number of PDCCH blind detections in n UE-specific search spaces and/or m common search spaces in the at least one search space, the reduced number of PDCCH blind detections being less than or equal to the maximum number of blind detections; and the terminal device performs PDCCH blind detection in the at least one search space according to the reduced number of PDCCH blind detections. According to the method and the terminal device, the terminal device can allocate the number of blind detections more reasonably, and reduce the complexity of channel estimation of the terminal device.

20 Claims, 2 Drawing Sheets

100

When the number of PDCCH blind detections in at least one search space of a terminal device is greater than a maximum number of blind detections, the terminal device reduces the number of PDCCH blind detections in n UE-specific search spaces included in the at least one search space and/or the number of PDCCH blind detections in m common search spaces included in the at least one search space, the reduced number of PDCCH blind detections in the at least one search space being less than or equal to the maximum number of blind detections, where n and m are integers greater than or equal to 0, and n and m are not 0 at the same time — S110

The terminal device performs a PDCCH blind detection in the at least one search space according to the reduced number of PDCCH blind detections in the at least one search space — S120

(51) Int. Cl.
*H04L 1/00* (2006.01)
*H04L 25/02* (2006.01)

(56) References Cited

U.S. PATENT DOCUMENTS

| | | | |
|---|---|---|---|
| 10,448,389 B1* | 10/2019 | Seo | H04L 1/0045 |
| 2010/0111013 A1 | 5/2010 | Chou | |
| 2010/0113043 A1 | 5/2010 | Hsuan | |
| 2010/0260124 A1 | 10/2010 | Noshio | |
| 2011/0103321 A1 | 5/2011 | Nishio | |
| 2012/0113932 A1 | 5/2012 | Nishio | |
| 2012/0149385 A1 | 6/2012 | Hsuan | |
| 2013/0176972 A1 | 7/2013 | Nishio et al. | |
| 2014/0133331 A1 | 5/2014 | Fu et al. | |
| 2014/0146771 A1 | 5/2014 | Nishio et al. | |
| 2015/0023292 A1 | 1/2015 | Nishio et al. | |
| 2015/0131591 A1 | 5/2015 | Liu et al. | |
| 2015/0230215 A1 | 8/2015 | Ye | |
| 2015/0373679 A1 | 12/2015 | Nishio et al. | |
| 2016/0135150 A1 | 5/2016 | Nishio et al. | |
| 2016/0278058 A1 | 9/2016 | Nishio et al. | |
| 2017/0135088 A1 | 5/2017 | Nishio et al. | |
| 2017/0325206 A1 | 11/2017 | Liu et al. | |
| 2018/0084536 A1 | 3/2018 | Nishio et al. | |
| 2018/0139024 A1* | 5/2018 | Shi | H04L 5/0053 |
| 2019/0150073 A1* | 5/2019 | Tiirola | H04W 72/10 |
| | | | 455/434 |
| 2019/0182820 A1 | 6/2019 | Nishio et al. | |
| 2019/0215098 A1* | 7/2019 | Tiirola | H04L 25/0238 |
| 2020/0245316 A1 | 7/2020 | Nishio et al. | |
| 2020/0404669 A1* | 12/2020 | Seo | H04W 76/27 |
| 2021/0067268 A1* | 3/2021 | Seo | H04W 4/40 |

FOREIGN PATENT DOCUMENTS

| | | |
|---|---|---|
| CN | 101925112 A | 12/2010 |
| CN | 102164416 A | 8/2011 |
| CN | 102215586 A | 10/2011 |
| CN | 102316495 A | 1/2012 |
| CN | 103812602 A | 5/2014 |
| CN | 104244417 A | 12/2014 |
| CN | 101867953 B | 6/2015 |
| CN | 104936206 A | 9/2015 |
| CN | 103428717 B | 9/2016 |
| EP | 2863694 A1 | 4/2015 |
| EP | 3041303 A1 | 7/2016 |
| JP | 2013503525 A | 1/2013 |
| KR | 20150028351 A | 3/2015 |
| KR | 20150084937 A | 7/2015 |

OTHER PUBLICATIONS

First Office Action of the Chinese application No. 201880002976.9, dated Jan. 19, 2020.
Notice of Allowance of the Chinese application No. 201880002976.9, dated Apr. 13, 2020.
Huawei et al:"Search space design", 3GPP Draft; R1-1706944, 3rd Generation Partnership Project (3GPP),Mobile Competence Centre ; 650, Route Des Lucioles ; F-06921 Sophia-Antipolis Cedex; France, vol. RAN WG1, No. Hangzhou, China; May 15, 2017-May 19, 2017 May 14, 2017 (May 14, 2017), XP051272174, Retrieved from the Internet: URL:http://www.3gpp.org/ftp/Meetings_3GPP_SYNC/RAN1/Docs/[retrieved on May 14, 2017] * section 2 *.
Supplementary European Search Report in the European application No. 18906472.8, dated Dec. 2, 2020.
MediaTek Inc., Remaining issues and changes in search space, Discussion and decision, 3GPP May 14, 2017 WG1 Meeting AH 1801 R1-1800145, Jan. 22-26, 2018.
Vivo, Remaining issues on PDCCH search space and blind decoding, Discussion and Decision, 3GPP TSG RAN WG1 Meeting AH 1801 R1-1800196, Jan. 22-26, 2018.
LG Electronics, Remaining issues on search space, Discussion and decision, 3GPP TSG RAN WG1 Meeting AH 1801R1-1800372, Jan. 22-26, 2018.
Samsung, Corrections on Search Space Design, Discussion/Decision, 3GPP TSG RAN WG1 Meeting AH 1801 R1-1800443, Jan. 22-26, 2018.
Nokia, Nokia Shanghai Bell, On reducing the PDCCH channel estimation and BD complexity in NR, Discussion and Decision, 3GPP TSG RAN WG1 Ad Hoc 1801 R1-1800550, Jan. 22-26, 2018.
Written Opinion of the International Search Authority in the international application No. PCT/CN2018/076771, dated Oct. 29, 2018.
Office Action of the Indian application No. 202017036861, dated Sep. 3, 2021. 6 pages with English translation.
First Office Action of the European application No. 18906472.8, dated Aug. 25, 2021. 5 pages.
3GPP TSG RAN WG1Meeting #88bis R1-1704202 Spokane, USA, Apr. 3-7, 2017 Agenda Item:8.1.3.1.4 Source: Huawei, HiSilicon. Title:"Search space design considerations" Document for: Discussion and decision. 4 pages.
3GPP TSG RAN WG1Meeting #82 R1-153753 Beijing, China, Aug. 24-28, 2015,Agenda Item:7.2.1.2,Source: Huawei, HiSilicon,Title:"Considerations on blind decoding for MTC UEs",Document for:Discussion and decision. 6 pages.
First Office Action of the Japanese application No. 2020-543039, dated Feb. 8, 2022. 8 pages with English translation.
First Office Action of the Korean application No. 10-2020-7025800, dated Dec. 27, 2021. 13 pages with English translation.
OPPO "Remaining issues on Search Space"[online]3GPP TSG RAN WG1 #92 R1-1802115,Internet<URL: http: //www.3gpp.org/ftp/tsg_ran/WG1_RL1/TSGR1_92/Docs/R1-1802115.zip>,Feb. 26-Mar. 2, 2018. 4 pages.

* cited by examiner

100

When the number of PDCCH blind detections in at least one search space of a terminal device is greater than a maximum number of blind detections, the terminal device reduces the number of PDCCH blind detections in n UE-specific search spaces included in the at least one search space and/or the number of PDCCH blind detections in m common search spaces included in the at least one search space, the reduced number of PDCCH blind detections in the at least one search space being less than or equal to the maximum number of blind detections, where n and m are integers greater than or equal to 0, and n and m are not 0 at the same time ⌒ S110

The terminal device performs a PDCCH blind detection in the at least one search space according to the reduced number of PDCCH blind detections in the at least one search space ⌒ S120

FIG. 1

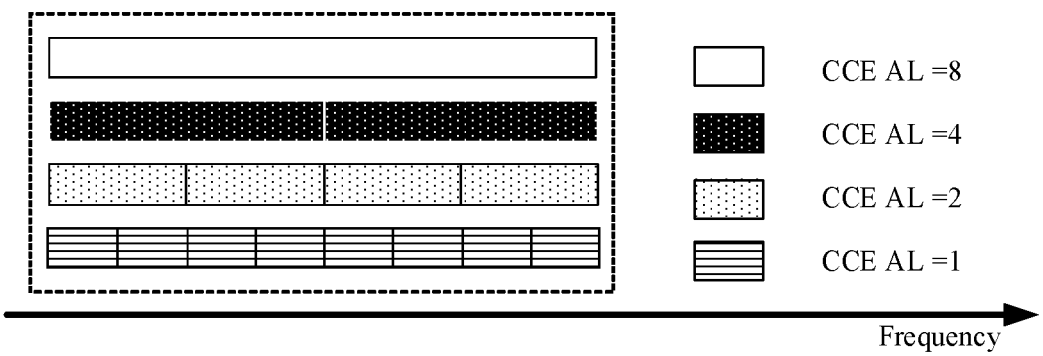

FIG. 2

METHOD FOR BLIND DETECTION OF PHYSICAL DOWNLINK CONTROL CHANNEL AND TERMINAL DEVICE

CROSS-REFERENCE TO RELATED APPLICATION

This application is a continuation of PCT Application NO. PCT/CN2018/076771 filed on Feb. 13, 2018, the contents of which are hereby incorporated by reference in its entirety.

BACKGROUND

In a Long Term Evolution (LTE) system, a PDCCH is generally transmitted in a control area of the system. The control area of the system usually occupies the entire system bandwidth. The number of symbols occupied in a time domain is 1-4. The number of symbols may be notified to a terminal device by a Physical Control Format Indicator Channel (PCFICH).

In the technical discussion on New Radio (NR) of a 5th Generation (5G) system, the concept of a Control Resource Set (CORESET) is introduced. CORESET can configure frequency domain resources occupied by a PDCCH search space and the length of a time domain. For example, several Orthogonal Frequency Division Multiplexing (OFDM) symbols are occupied in terms of time, a network device may configure multiple CORESETs for a terminal device. A search space configured by the network device may be associated with a certain CORESET, and the position of time-frequency resources occupied by the search space can be determined by configuring relevant parameters for the search space.

SUMMARY

The disclosure relates to the field of communications, and more particularly, to a method for blind detection of a Physical Downlink Control Channel (PDCCH) and a terminal device.

A first aspect provides a method for blind detection of a PDCCH. The method may be implemented by a terminal device which has at least one search space comprising n UE-specific search spaces and m common search spaces. The method may include that: when the number of PDCCH blind detections in the at least one search space of the terminal device is greater than a maximum number of blind detections, the terminal device reduces the number of PDCCH blind detections in the n UE-specific search spaces included in the at least one search space, the reduced number of PDCCH blind detections in the at least one search space being less than or equal to the maximum number of blind detections, where n and m are integers greater than or equal to 0, and n and m are not 0 at the same time; and the terminal device performs a PDCCH blind detection in the at least one search space according to the reduced number of PDCCH blind detections in the at least one search space.

A second aspect provides a terminal device. The terminal device is configured to perform the method in the first aspect or any possible implementation of the first aspect. Specifically, the terminal device includes units configured to perform the method in the first aspect or any possible implementation of the first aspect.

A third aspect provides a terminal device. The terminal device includes a memory and a processor. The memory is configured to store an instruction. The processor is configured to execute the instruction stored in the memory, and when the processor executes the instruction stored in the memory, the processor is caused to perform the method in the first aspect or any possible implementation of the first aspect.

A fourth aspect provides a computer-readable medium that is configured to store a computer program. The computer program can include an instruction for performing the method in the first aspect or any possible implementation of the first aspect.

A fifth aspect provides a computer program product including an instruction. When a computer runs the instruction of the computer program product, the computer can perform the method for blind detection of a PDCCH in the first aspect or any possible implementation of the first aspect. Specifically, the computer program product may be run on the terminal device in the second aspect.

BRIEF DESCRIPTION OF THE DRAWINGS

FIG. 1 is a schematic flowchart of a method for blind detection of a PDCCH according to an embodiment of the disclosure.

FIG. 2 is a schematic diagram of a special search space block according to an embodiment of the disclosure.

DETAILED DESCRIPTION

Figure 3:
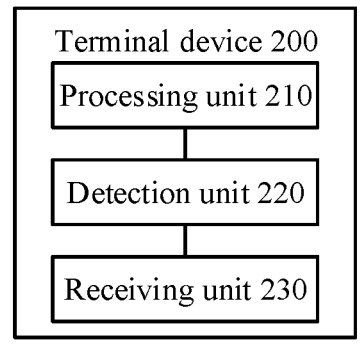
FIG. 3 is a schematic block diagram of a terminal device according to an embodiment of the disclosure.

A terminal device typically blindly detects a PDCCH in a search space configured by a network device. In an NR system, the blind detection capability of the terminal device can be defined from different dimensions. For example, the number of blind detections of the terminal device is defined according to a single carrier or multiple carriers; or, the number of blind detections is defined according to that the terminal device supports PDCCH detection based on slot granularity or PDCCH detection based on micro-slot granularity.

The network device may configure multiple search spaces for the terminal device. In each search space, the number of PDCCH candidates corresponding to different Aggregation Levels (ALs) is configured, that is, the number of PDCCH blind detections corresponding to different ALs. The terminal device may monitor PDCCH candidates in each search space. The number of PDCCH blind detection times may be determined by the number of PDCCH candidates. In order to use PDCCH resources more efficiently, a total number of PDCCH candidates that is configured by the network device in certain slots may exceed the detection capability of the terminal device, that is, exceeding a maximum number of blind detections supported by the terminal device. In such a case, how to perform effective PDCCH blind detection by the terminal device is a problem to be solved.

The technical solutions in the embodiments of the disclosure will be described with reference to the accompanying drawings.

The technical solutions in the embodiments of the disclosure may be applied to various communication systems such as a Global System of Mobile communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, an LTE Time Division Duplex (TDD), a Universal Mobile Telecommunication System (UMTS), or a Worldwide Interoperability for Microwave Access (WiMAX) communication system, a future 5G system or an NR system.

The terminal device in the embodiments of the disclosure may be a User Equipment (UE), an access terminal, a user unit, a user station, a mobile station, a mobile platform, a remote station, a remote terminal, a mobile device, a user terminal, a terminal, a wireless communication device, a user proxy or a user apparatus. The terminal device may be a cellular phone, a cordless telephone, a Session Initiation Protocol (SIP) phone, a Wireless Local Loop (WLL) station, a Personal Digital Assistant (PDA), a handheld device having a wireless communication function, a computing device or other processing devices, vehicle-amounted devices and wearable devices connected to a wireless modulator-demodulator, a terminal device in a future 5G network or a terminal device in a future evolved Public Land Mobile Network (PLMN), all of which are not defined in the embodiments of the disclosure.

A network device in the embodiments of the disclosure may be a device for communicating with the terminal device. The network device may be a Base Transceiver Station (BTS) in a GSM or CDMA, or may be a NodeB (NB) in a WCDMA system, or may be an Evolutional NodeB (eNB or eNodeB) in an LTE system or may also be a wireless controller in a Cloud Radio Access Network (CRAN) scene; or the network device may be a relay station, an access point, a vehicle-amounted device, a wearable device as well as a network device in a future 5G system or a network device in the future evolved PLMN network, all of which are not defined in the embodiments of the disclosure.

FIG. 1 shows a schematic flowchart of a blind detection method 100 for a PDCCH according to an embodiment of the disclosure. The method 100 may be implemented by a terminal device. As shown in FIG. 1, the method 100 includes the following steps. In S110, when the number of PDCCH blind detections in at least one search space of a terminal device is greater than a maximum number of blind detections, the terminal device reduces the number of PDCCH blind detections in n UE-specific search spaces included in the at least one search space and/or the number of PDCCH blind detections in m common search spaces included in the at least one search space, the reduced number of PDCCH blind detections in the at least one search space being less than or equal to the maximum number of blind detections, where n and m are integers greater than or equal to 0, and n and m are not 0 at the same time. In S120, the terminal device performs a PDCCH blind detection in the at least one search space according to the reduced number of PDCCH blind detections in the at least one search space.

In the embodiments of the disclosure, the network device may configure at least one search space for the terminal device. The at least one search space may include n UE-specific search spaces and m common search spaces; n and m are positive numbers greater than or equal to 0, but n and m are not 0 at the same time. For example, any one search space in the at least one search space may be a UE-specific search space or a common search space, the network device may use an association relationship between the search space and a certain CORESET as well as related parameters to configure a time-frequency resource position occupied by the search space for the terminal device. The related parameters may include at least one of: a monitoring period of a search space, the number of offset slots in the search space within the monitoring period, a starting symbol position of the search space in a slot, one or more ALs included in the search space and the number of PDCCH candidates at each AL, and a Downlink Control Information (DCI) format corresponding to the search space.

In an NR system, a PDCCH may be composed of CCEs. Each CCE may specifically be composed of Resource-Element Groups (REGs). Each REG may include multiple Resource Elements (REs). Specifically, in the NR, the REG may be the size of a Physical Resource Block (PRB) in a frequency domain, which is the size of an OFDM symbol in time. Multiple REGs may be combined into a REG bundle. The REG bundle may include 2, 3, or 6 REGs. A CCE generally includes 6 REGs.

In the NR system, the blind detection capability of the terminal device can be defined from different dimensions. For example, the number of blind detections of the terminal is defined according to a single carrier or multiple carriers; or, the number of blind detections is defined according to that the terminal device supports a PDCCH detection based on slot granularity or PDCCH detection based on micro-slot granularity. Microslot-based PDCCH detection means that the time domain position of the PDCCH may be anywhere in a slot, rather than being limited to the first 2 or 3 OFDM symbols in the slot. For example, slot-based PDCCH detection is defined in the NR system. For a single carrier, the maximum number of blind detections may be set to 44.

In addition, the network device may configure multiple search spaces for the terminal device, configure PDCCH candidates corresponding to different ALs in each search space, also configure the number of PDCCH candidates corresponding to each AL, and configure corresponding DCI formats for each search space. The terminal device may detect a certain PDCCH candidate according to a configured DCI format at each AL, which is called a PDCCH search or blind detection. For example, a search space configured by the network device for the terminal device includes an AL (AL=2), and there are four PDCCH candidates at the AL, moreover, two DCI formats are configured for the search space, in such a case, the terminal device may detect four PDCCH candidates respectively according to two DCI formats, and eight blind detections are needed at a maximum.

In order to use PDCCH resources more efficiently, a total number of PDCCH candidates that is configured by the network device in certain slots may exceed the detection capability of the terminal device, that is, exceeding a maximum number of blind detections supported by the terminal device.

For example, Table 1 below is taken as an example. It is assumed that the network device configures 3 search spaces for the terminal device, and all the 3 search spaces have different monitoring periods and different numbers of blind detections. For example, the monitoring period of search space 1 is four slots, and the blind detection is performed 6 times in each slot. The monitoring period of search space 2 is 1 slot, and the blind detection is performed 40 times in each slot. The monitoring period of search space 3 is eight slots, and the blind detection is performed twice in each slot. In some slots, the total number of blind detections in multiple search spaces may exceed the maximum blind detection capability of the terminal. For example, if the maximum number of blind detections is 44, then the slots 0, 4, 8, 12, and 16 all exceed the maximum number of blind detections. In such a case, how to allocate the number of blind detections by the terminal device or how to configure the number of blind detections by the network device is a problem to be solved.

TABLE 1

| Slot Index | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Search Space 1 | 6 | | | | 6 | | | | 6 | | | | 6 | | | | 6 |
| Search Space 2 | 40 | 40 | 40 | 40 | 40 | 40 | 40 | 40 | 40 | 40 | 40 | 40 | 40 | 40 | 40 | 40 | 40 |
| Search Space 3 | 2 | | | | | | | | 2 | | | | | | | | 2 |

In addition, in the NR system, the complexity of channel estimation is also introduced during a PDCCH blind detection. The complexity of channel estimation is related to the number of CCEs required for channel estimation in a search space. For example, the maximum number of CCE channel estimations supported by the terminal device is 48, and when the maximum number of CCE channel estimations of the terminal device is exceeded, there is also a problem of how to reduce the complexity of channel estimation of the terminal device.

In summary, the embodiment of the disclosure provides a method for blind detection of a PDCCH, which can solve the above problems.

In S110, when the number of PDCCH blind detections in at least one search space is greater than a maximum number of blind detections, the terminal device may reduce the number of PDCCH blind detections corresponding to n UE-specific search spaces and/or m common search spaces in the at least one search space, and stop reduction until the number of PDCCH blind detections in the at least one search space is less than or equal to the maximum number of blind detections. Specifically, the terminal device may reduce the number of PDCCH blind detections in the n UE-specific search spaces according to a preset rule, and if the number of PDCCH blind detections in the at least one search space after reduction is still greater than the maximum number of blind detections, the number of PDCCH blind detections in the m common search spaces may be then reduced. Or, the terminal device may reduce the number of PDCCH blind detections in the n UE-specific search spaces according to a preset rule, and stop reducing the number of PDCCH blind detections in the n UE-specific search spaces until the number of PDCCH blind detections in the at least one search space is less than or equal to the maximum number of blind detections, rather than reducing the number of PDCCH blind detections in m common search spaces. The embodiments of the disclosure are not limited thereto.

It is to be understood that for any search space in at least one search space in the embodiment of the disclosure, when multiple DCI formats are configured, a PDCCH blind detection may be performed according to each DCI format respectively, and each PDCCH blind detection may correspond to a PDCCH search.

In an example, the preset rule used when reducing the number of PDCCH blind detections in the n UE-specific search spaces may also be used to reduce the number of PDCCH blind detections in the m common search spaces. For ease of description, the following preset rule of reducing the number of PDCCH blind detections in the n UE-specific search spaces is taken as an example, and also applicable to the m common search spaces.

When the terminal device reduces the number of PDCCH blind detections in the n UE-specific search spaces according to a preset rule, the preset rule may be: reducing the number of PDCCH blind detections in the n UE-specific search spaces in different orders. For example, the terminal device may reduce the number of PDCCH blind detections according to an order of different PDCCH ALs (referred to as "AL") of the n UE-specific search spaces, or the terminal device may also reduce the number of PDCCH blind detections in an order of search-space index values of the n UE-specific search spaces. The embodiments of the disclosure are not limited thereto.

In an example, the preset rule may be that: the terminal device reduces the number of PDCCH blind detections in an order of different ALs in the n UE-specific search spaces. Specifically, the terminal device may preferentially reduce the number of PDCCH blind detections corresponding to a lower AL in the n UE-specific search spaces. For example, the terminal device sequentially reduces the number of PDCCH blind detections corresponding to different ALs in the n UE-specific search spaces according to a first preset order, the first preset order being: an ascending order of ALs in the n UE-specific search spaces. The present embodiment is also applicable to a descending order of ALs.

In the embodiment of the disclosure, for any one UE-specific search space, PDCCHs of different ALs may be included, and each AL may correspond to the respective number of PDCCH blind detections. For example, the UE-specific search space may include at least one of ALs 1, 2, 4, 8, and 16. Each AL may correspond to the respective number of PDCCH blind detections. The terminal device may sequentially reduce the number of PDCCH blind detections corresponding to the ALs in an ascending order of ALs in the n UE-specific search spaces. When the number of PDCCH blind detections in at least one search space of the terminal device meets the maximum number of blind detections after the number of PDCCH blind detections is reduced to a certain AL, the reduction may be stopped, that is, the number of PDCCH blind detections corresponding to other high-level ALs is no longer reduced.

In an example, if there are multiple search spaces including the same AL in the n UE-specific search spaces, for the multiple UE-specific search spaces including the same AL, the number of PDCCH blind detections corresponding to the same AL in the multiple search spaces with the same AL may be sequentially reduced in an ascending order or descending order of search-space index values.

The terminal device may sequentially reduce the number of PDCCH blind detections corresponding to the AL in an ascending order of ALs or an ascending order or descending order of search-space index values for the same AL until lowering a first PDCCH AL in a first UE-specific search space in n UE-specific search spaces. When the number of PDCCH blind detections in at least one search space of the terminal device is less than or equal to the maximum number of blind detections, the terminal device may stop reducing the number of PDCCH blind detections in the at least one search space, that is, not reducing other search levels or other search spaces, of which ranking positions are behind the first PDCCH AL of the first UE-specific search space, any longer, otherwise the number of PDCCH blind detections in the UE-specific search space may continue to be reduced. The first UE-specific search space may be any one of the n UE-specific search spaces, and the first PDCCH AL may be any one of the ALs included in the n UE-specific search spaces.

It is to be understood that, for the number of PDCCH blind detections corresponding to any AL in any UE-specific search space, the number of PDCCH blind detections that need to be reduced may be preset, or may be set for the network device. Specifically, the terminal device may receive first indication information from a network device. The first indication information may indicate the reduced number of PDCCH blind detections corresponding to each AL in the n UE-specific search spaces.

It is to be understood that the reduced number of PDCCH blind detections corresponding to different ALs in the n UE-specific search spaces may be the same or different. If they are the same, it represents that the same number of PDCCH blind detections is reduced for each AL. If the number of PDCCH blind detections at a certain AL is less than or equal to the reduced number, after the reduction, the number of PDCCH blind detections at the AL may be set to 0. If they are different, half of the original number of PDCCH blind detections may be reduced for each AL, for example, but the embodiments of the disclosure are not limited thereto.

Some embodiments are exemplified below.

For example, the terminal device includes two UE-specific search spaces. The two UE-specific search spaces are UE-specific search space 0 and UE-specific search space 1. Each UE-specific search space includes ALs 1, 2, 4, 8, and 16. Each AL of each UE-specific search space corresponds to the respective number of PDCCH blind detections. In the process of reducing the number of PDCCH blind detections, the number of PDCCH blind detections with a lower AL, that is, the AL 1 is first reduced. Since the two UE-specific search spaces both include AL 1, the number of PDCCH blind detections corresponding to the AL 1 in the UE-specific search space 0 may be reduced first in an ascending order of search-space index values of the UE-specific search spaces. After the reduction, if the limit of the maximum number of blind detections is still not met, the number of PDCCH blind detections corresponding to the AL 1 in the UE-specific search space 1 may be reduced. After the reduction, if the limit of the maximum number of blind detections is still not met, the AL may be increased by one level, that is, the number of PDCCH blind detections corresponding to AL 2 in the UE-specific search space 0 may be reduced, and so on. After reducing to a certain AL in a certain search space, for example, after reducing the number of PDCCH blind detections corresponding to AL 8 in the UE-specific search space 0, the reduction is stopped when the number of PDCCH blind detections in at least one search space of the terminal device is less than or equal to the maximum number of blind detections. That is, the number of PDCCH blind detections is no longer reduced for ALs ranked behind the AL 8 in the UE-specific search space 0. For example, the number of PDCCH blind detections in the AL 8 in the UE-specific search space 1 remains unchanged.

In an example, the preset rule may further be that: the terminal device reduces the number of PDCCH blind detections in an order of search-space index values of the n UE-specific search spaces. Specifically, the terminal device may start to reduce the number of PDCCH blind detections from the UE-specific search space with the largest search-space index value, or the terminal device may also start to reduce from the UE-specific search space with the smallest search-space index value. For example, the terminal device starts to reduce the number of PDCCH blind detections from the UE-specific search space with the smallest search-space index value. Specifically, the terminal device may preferentially reduce the number of PDCCH blind detections corresponding to a UE-specific search space with a smaller search-space index value in the n UE-specific search spaces. For example, the terminal device sequentially reduces the number of PDCCH blind detections corresponding to different search spaces in the n UE-specific search spaces according to a second preset order, the second preset order being: an ascending order of search-space index values of the n UE-specific search spaces.

It is to be understood that the terminal device may sequentially reduce the corresponding number of PDCCH blind detections in an ascending order of search-space index values of the n UE-specific search spaces. When the number of PDCCH blind detections in at least one search space of the terminal device meets the limit of the maximum number of blind detections after the number of PDCCH blind detections is reduced to a certain UE-specific search space, the reduction may be stopped, that is, the number of PDCCH blind detections corresponding to other high-level ALs is no longer reduced.

In an example, for any UE-specific search space in the n UE-specific search spaces, if the UE-specific search space includes multiple ALs, the number of PDCCH blind detections at the AL included in the same UE-specific search space may be sequentially reduced in an ascending order of the multiple ALs.

According to an order of search-space index values of n UE-specific search spaces, the terminal device may sequentially reduce the number of PDCCH blind detections corresponding to at least one AL included in the corresponding UE-specific search space in an ascending order of ALs in the same UE-specific search space until the number of PDCCH blind detection times of a second PDCCH AL of a second UE-specific search space in n UE-specific search spaces is reduced. If the number of PDCCH blind detections in at least one search space of the terminal device is less than or equal to the maximum number of blind detections, the terminal device may stop reducing the number of PDCCH blind detections in the at least one search space, that is, other search levels and other search spaces, of which ranking positions are located behind the second PDCCH AL of the second UE-specific search space, are no longer reduced, otherwise the number of PDCCH blind detections in the UE-specific search space continues to be reduced. The second UE-specific search space may be any one of the n UE-specific search spaces, and the second PDCCH AL may be any one of the ALs included in the n UE-specific search spaces.

It is to be understood that, for the number of PDCCH blind detections corresponding to any AL in any UE-specific search space, the number of PDCCH blind detections that need to be reduced may be preset, or may be set for the network device. Specifically, the terminal device may receive first indication information from a network device. The first indication information may indicate the reduced number of PDCCH blind detections corresponding to each AL in the n UE-specific search spaces.

It is to be understood that the reduced number of PDCCH blind detections corresponding to different ALs in the n UE-specific search spaces may be the same or different. If they are the same, the same number of PDCCH blind detections may be reduced for each AL. If the number of PDCCH blind detections at a certain AL is less than or equal to the reduced number, after the reduction, the number of PDCCH blind detections at the certain AL may be set to 0. If they are different, half of the original number of PDCCH blind detections may be set to be reduced for each AL, but the embodiments of the disclosure are not limited thereto.

Some embodiments are exemplified below.

For example, the terminal device includes two UE-specific search spaces. The two UE-specific search spaces are UE-specific search space 0 and UE-specific search space 1. Each UE-specific search space includes ALs 1, 2, 4, 8, and 16. Each AL of each UE-specific search space corresponds to the respective number of PDCCH blind detections. In the process of reducing the number of PDCCH blind detections, the number of PDCCH blind detections in a UE-specific search space with a smaller search-space index value, that is, UE-specific search space 0, is first reduced. Since the UE-specific search space includes 5 ALs, the number of PDCCH blind detections corresponding to AL 1 in the UE-specific search space 0 may be reduced first in an ascending order of ALs. After the reduction, if the limit of the maximum number of blind detections is still not met, the number of PDCCH blind detections corresponding to AL 2 in the UE-specific search space 0 may be reduced. After the reduction, if the limit of the maximum number of blind detections is still not met, the AL in the UE-specific search space 0 may be increased by one level, that is, the number of PDCCH blind detections corresponding to AL 4 in the UE-specific search space 0 may be reduced, and so on. After reducing to a certain AL in a certain search space, for example, after reducing the number of PDCCH blind detections of AL 2 in the UE-specific search space 1, when the number of PDCCH blind detections in at least one search space of the terminal device is less than or equal to the maximum number of blind detections, the reduction may be stopped. That is, the number of PDCCH blind detections is no longer reduced for ALs ranked behind the AL 2 in the UE-specific search space 1. For example, the number of PDCCH blind detections at the AL 4 in the UE-specific search space 1 remains unchanged.

In the embodiment of the disclosure, there may be a special search space block in the n UE-specific search spaces of the terminal device, and the search space block may include a PDCCH structure that is a nested structure. In such a case, the terminal device may reduce the number of PDCCH blind detections in n UE-specific search spaces according to a preset rule. The preset rule may be that: the number of PDCCH blind detections corresponding to the special search space block is reduced.

The preset rule may include that: if time-frequency resources occupied by a PDCCH corresponding to a third PDCCH AL in the n UE-specific search spaces of the terminal device overlap with time-frequency resources occupied by a PDCCH corresponding to a fourth PDCCH AL, the time-frequency resources occupied by the PDCCH corresponding to the fourth PDCCH AL may be referred to as a special search space block. The terminal device may reduce the number of PDCCH blind detections corresponding to the third PDCCH AL and/or the fourth PDCCH AL to 0. The third PDCCH AL may be any AL in any UE-specific search space, the fourth PDCCH AL may be any AL in any UE-specific search space, and the third PDCCH AL is lower than the fourth PDCCH AL.

For example, FIG. 2 illustrates a schematic diagram of a special search space block. As shown in FIG. 2, the search space block includes a nested PDCCH structure. A high-AL CCE in the figure includes a low-AL CCE. Specifically, in FIG. 2, time-frequency resources occupied by eight CCEs occupied by eight PDCCH candidates of AL 1, time-frequency resources occupied by eight CCEs occupied by four PDCCH candidates of AL 2, time-frequency resources occupied by eight CCEs occupied by two PDCCH candidates of AL 4 and time-frequency resources occupied by eight CCEs occupied by one PDCCH candidate of AL 8 completely overlap. But for a clearer illustration, FIG. 2 shows the same frequency in the horizontal direction, but shows four ALs in the longitudinal direction respectively. For the four PDCCH candidates of AL 2, two CCEs occupied by each PDCCH candidate correspond to two CCEs with AL 1 respectively, then the AL 2 is the above-mentioned fourth PDCCH AL, the AL 1 is the above-mentioned third PDCCH AL, and the preset rule may be that: the number of PDCCH blind detections corresponding to the AL 2 and/or AL 1 is reduced to 0. Similarly, for example, in two PDCCH candidates of AL 4, four CCEs occupied by each PDCCH candidate correspond to four CCEs with two ALs 2, and the preset rule may be that: the number of PDCCH blind detections corresponding to the AL 4 and/or AL 2 is reduced to 0. For another example, eight CCEs occupied by one PDCCH candidate at AL 8 correspond to eight CCEs with two ALs 4, and the preset rule may be that: the number of PDCCH blind detections corresponding to the AL 8 and/or AL 4 is reduced to 0.

By analogy, if the n UE-specific search spaces of the terminal device include multiple special search space blocks similar to the above, the preset rule may be that: the terminal device reduces some of the special search space blocks and the corresponding number of PDCCH blind detections, thereby achieving the purpose of reducing the total number of PDCCH blind detections.

In an example, for reducing one of the special search space blocks, the number of all PDCCH searches corresponding to the search space block may be reduced, for example, the number of all PDCCH searches corresponding to the search space block in FIG. 2 is deleted; or the number of PDCCH blind detections corresponding to a part of ALs below the search space block may also be reduced, which may also achieve the purpose of reducing the total number of blind detections of the terminal. For example, the search space block in FIG. 2 may reduce the number of PDCCH blind detections corresponding to the ALs 1, 2 and 4, and retain the number of PDCCH blind detections corresponding to the AL 8. Or, the search space block in FIG. 2 may reduce the number of searches at the second AL 4 and the ALs 1 and 2 with the same CCE to 0, retain the number of searches at the AL 8, and the number of searches at the first AL 4 and the ALs 1 and 2 with the same CCE.

It is to be understood that the method 100 may further include that: the terminal device receives second indication information from the network device, the second indication information indicating to reduce the number of PDCCH blind detections corresponding to the third PDCCH AL and/or the fourth PDCCH AL to 0. Specifically, the terminal device may determine to reduce all or part of the number of PDCCH blind detections corresponding to one or more of the above special search space blocks according to the configuration of the network device.

It is to be understood that the original number of PDCCH blind detections corresponding to each AL in each UE-specific search space in the embodiments of the disclosure may be set for the network device or may be preset, and the embodiments of the disclosure are not limited thereto.

It is to be understood that the preset rule used by the terminal device in the embodiments of the disclosure may be pre-configured or configured by the network device. Specifically, the terminal device may receive a preset rule from the network device, so that the terminal device may reduce the number of PDCCH blind detections in n UE-specific search spaces or m common search spaces according to the preset rule, but the embodiments of the disclosure are not limited thereto.

It is to be understood that it is considered that the complexity of channel estimation during a PDCCH blind detection is related to the total number of Control Channel Elements (CCEs) required for channel estimation in multiple search spaces. For example, the maximum number of CCE channel estimations supported by the terminal device is 48. When the maximum number of CCE channel estimations of the terminal device is exceeded, the above mode may also be used to reduce the total number of CCEs required for channel estimation in at least one search space, that is, the terminal device reduces the number of PDCCH blind detections corresponding to n UE-specific search spaces and/or m common search spaces in at least one search space, and also reduces the number of CCEs required for channel estimation. In the process of reducing the number of PDCCH blind detections until it is less than or equal to the maximum number of blind detections. If the total number of CCEs required for channel estimation corresponding to at least one search space is still greater than the maximum value, the number of PDCCH blind detections corresponding to n UE-specific search spaces and/or m common search spaces in the at least one search space may continue to be reduced until the total number of CCEs required for channel estimation in the corresponding at least one search space is less than or equal to the maximum value, so that the problem of reducing the complexity of channel estimation of the terminal device can be effectively solved. Therefore, the method for reducing the number of blind detections of a terminal device in the embodiments of the disclosure is also applicable to solving the problem of reducing the complexity of channel estimation of the terminal device during the PDCCH blind detection.

It is to be noted that when the search space has a nested structure, in order to reduce the number of blind detections, the number of searches at a low AL can be reduced to reduce the total number of blind detections. However, when the complexity of channel estimation needs to be reduced, reducing the number of searches at a low AL cannot reduce the complexity of channel estimation, because the PDCCH candidate with a high AL still includes all CCEs required for channel estimation. In such a case, the number of searches at all ALs of the search space block is reduced to 0, so as to achieve the purpose of reducing the complexity of channel estimation. Or, the number of PDCCH blind detections at a high AL is preferentially reduced to 0, and the complexity of the search space can be reduced by reducing the number of part of PDCCH searches at a low AL.

For example, as shown in FIG. 2, in order to reduce the complexity of channel estimation, that is, reduce the number of CCEs required for channel estimation, the number of PDCCH blind detections at all ALs of the search space block may be reduced to 0. In such a case, it is not necessary to perform channel estimation on all CCEs of the search space block, thereby reducing the complexity of channel estimation. Or, the number of PDCCH blind detections at AL 8 is reduced to 0, the number of PDCCH blind detections at the second AL of 4 is reduced to 0, and the number of searches at all ALs of 2 and 1 with the same CCE is reduced to 0. In such a case, it is only necessary to perform blind detection on a PDCCH at a first AL 4 and the ALs 2 and 1 with the same CCE. Therefore, only the channel estimation of four CCEs needs to be performed, and the complexity of channel estimation can also be reduced.

According to the method for blind detection of a PDCCH in the embodiments of the disclosure, when the number of PDCCH blind detections in at least one search space is greater than a maximum number of blind detections, the terminal device may reduce the number of PDCCH blind detections in the at least one search space according to a certain preset rule until the number of PDCCH blind detections is less than or equal to the maximum number of blind detections, so that the terminal device can allocate the number of blind detections more reasonably, and reduce the complexity of channel estimation of the terminal device.

It is to be understood that in various embodiments of the disclosure, the sequence number of each process does not mean an execution sequence, and the execution sequence of each process may be determined by its function and an internal logic and should not form any limit to an implementation process of the embodiments of the disclosure.

In addition, the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

The method for blind detection of a PDCCH according to the embodiment of the disclosure is described in detail above with reference to FIG. 1 and FIG. 2. The terminal device according to the embodiment of the disclosure will be described below with reference to FIG. 3 and FIG. 4.

As shown in FIG. 3, the terminal device 200 according to the embodiment of the disclosure includes a processing unit 210 and a detection unit 220, and in an example, the terminal device 200 may further include a receiving unit 230. The processing unit 210 is configured to reduce, when the number of PDCCH blind detections in at least one search space of a terminal device is greater than a maximum number of blind detections, the number of PDCCH blind detections in n UE-specific search spaces included in the at least one search space and/or the number of PDCCH blind detections in m common search spaces included in the at least one search space, the reduced number of PDCCH blind detections in the at least one search space being less than or equal to the maximum number of blind detections, where n and m are integers greater than or equal to 0, and n and m are not 0 at the same time; and the detection unit 220 is configured to perform a PDCCH blind detection in the at least one search space according to the reduced number of PDCCH blind detections in the at least one search space.

According to the terminal device in the embodiments of the disclosure, when the number of PDCCH blind detections in at least one search space is greater than a maximum number of blind detections, the number of PDCCH blind detections in the at least one search space may be reduced according to a certain preset rule until the number of PDCCH blind detections is less than or equal to the maximum number of blind detections, so that the terminal device can allocate the number of blind detections more reasonably, and reduce the complexity of channel estimation of the terminal device.

In an example, n and m may be positive numbers greater than 0. The processing unit 210 may be configured to: reduce, after reducing the number of PDCCH blind detections in the n UE-specific search spaces according to a preset rule, the number of PDCCH blind detections in the m common search spaces if the reduced number of PDCCH blind detections in the at least one search space is greater than the maximum number of blind detections, or not reduce, if the reduced number of PDCCH blind detections in the at least one search space is less than or equal to the maximum number of blind detections, the number of PDCCH blind detections in the m common search spaces.

In an example, the preset rule may include that: the processing unit 210 preferentially reduces the number of PDCCH blind detections corresponding to a low-level PDCCH AL in the n UE-specific search spaces.

In an example, the preset rule may include that: the processing unit 210 sequentially reduces the number of PDCCH blind detections corresponding to different PDCCH ALs in the n UE-specific search spaces according to a first preset order, the first preset order being an ascending order of PDCCH ALs in the n UE-specific search spaces.

In an example, the preset rule may further include that: if a condition that the number of PDCCH blind detections in the at least one search space is less than or equal to the maximum number of blind detections is satisfied after lowering a first PDCCH AL in a first UE-specific search space in the n UE-specific search spaces, the processing unit 210 stops reducing the number of PDCCH blind detections in the at least one search space. The first UE-specific search space may be any UE-specific search space in the n UE-specific search spaces, and the first PDCCH AL may be any PDCCH AL in the n UE-specific search spaces.

In an example, the first preset order may further include: in a case that there are a plurality of UE-specific search spaces including the same PDCCH AL, an ascending order of search-space index values for the plurality of UE-specific search spaces.

In an example, the preset rule may include that: the processing unit 210 preferentially reduces the number of PDCCH blind detections in a UE-specific search space with a small search-space index value in the n UE-specific search spaces.

In an example, the preset rule may further include that: in any UE-specific search space, the terminal device preferentially reduces the number of PDCCH blind detections corresponding to a low-level PDCCH AL.

In an example, the preset rule may specifically include that: the processing unit 210 sequentially reduces the number of PDCCH blind detections corresponding to different search spaces in the n UE-specific search spaces according to a second preset order, the second preset order being an ascending order of search-space index values of the n UE-specific search spaces.

In an example, the preset rule may further include that: if a condition that the number of PDCCH blind detections in the at least one search space is less than or equal to the maximum number of blind detections is satisfied after reducing the number of PDCCH blind detection times of a second PDCCH AL of a second UE-specific search space in the n UE-specific search spaces, the processing unit 210 may stop reducing the number of PDCCH blind detections in the at least one search space. The second UE-specific search space may be any UE-specific search space in the n UE-specific search spaces, and the second PDCCH AL may be any PDCCH AL in the n UE-specific search spaces.

In an example, the second preset order may further include: an ascending order of PDCCH ALs in the same UE-specific search space.

In an example, the number of PDCCH blind detections reduced for different PDCCH ALs in the n UE-specific search spaces may be different.

In an example, the number of PDCCH blind detections reduced for each PDCCH AL in the n UE-specific search spaces may be preset.

In an example, the receiving unit 230 may be configured to receive first indication information from a network device, the first indication information indicating the reduced number of PDCCH blind detections corresponding to each PDCCH AL in the n UE-specific search spaces.

In an example, the preset rule may include that: if time-frequency resources occupied by a PDCCH corresponding to a third PDCCH AL in the n UE-specific search spaces overlap with time-frequency resources occupied by a PDCCH corresponding to a fourth PDCCH AL, the processing unit 210 reduces the number of PDCCH blind detections corresponding to the third PDCCH AL and/or the fourth PDCCH AL to 0, the third PDCCH AL being lower than the fourth PDCCH AL.

In an example, the receiving unit 230 may be configured to receive second indication information from the network device, the second indication information indicating to reduce the number of PDCCH blind detections corresponding to the third PDCCH AL and/or the fourth PDCCH AL to 0.

It is to be understood that the terminal device 200 accordingly implement the method 100 in the embodiment of the disclosure. Furthermore, the above and other operations and/or functions of each unit in the terminal device 200 are respectively intended to implement a corresponding process of the terminal device in each method in FIG. 1 to FIG. 2 and will not be repeated for the briefness.

According to the terminal device in the embodiments of the disclosure, when the number of PDCCH blind detections in at least one search space is greater than a maximum number of blind detections, the number of PDCCH blind detections in the at least one search space may be reduced according to a certain preset rule until the number of PDCCH blind detections is less than or equal to the maximum number of blind detections, so that the terminal device can allocate the number of blind detections more reasonably, and reduce the complexity of channel estimation of the terminal device.

Figure 4:
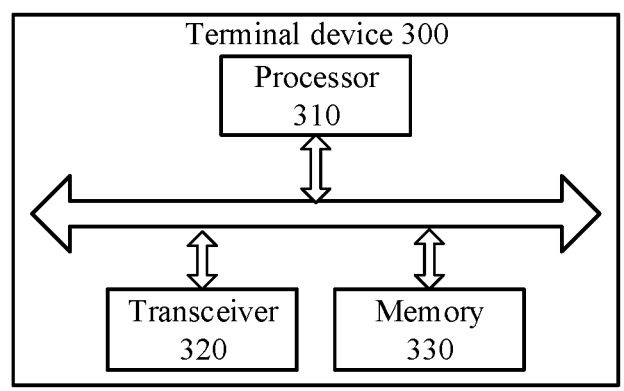
FIG. 4 is another schematic block diagram of a terminal device according to an embodiment of the disclosure.

FIG. 4 illustrates a schematic block diagram of a terminal device 300 according to an embodiment of the disclosure. As shown in FIG. 4, the terminal device 300 includes: a processor 310 and a transceiver 320. The processor 310 may be connected to the transceiver 320. In an example, the terminal device 300 may further include a memory 330. The memory 330 may be connected to the processor 310. The processor 310, the memory 330 and the transceiver 320 may communicate with each other through an internal connection path to transfer and/or control a data signal. The memory 330 may be configured to store an instruction. The processor 310 may be configured to execute the instruction stored in the memory 330 to control the transceiver 320 to send information or signals. The processor 310 may be configured to: reduce, when the number of PDCCH blind detections in at least one search space of a terminal device is greater than a maximum number of blind detections, the number of PDCCH blind detections in n UE-specific search spaces included in the at least one search space and/or the number of PDCCH blind detections in m common search spaces included in the at least one search space, the reduced number of PDCCH blind detections in the at least one search space being less than or equal to the maximum number of blind detections, where n and m are integers greater than or equal to 0, and n and m are not 0 at the same time; and perform a PDCCH blind detection in the at least one search space according to the reduced number of PDCCH blind detections in the at least one search space.

According to the terminal device in the embodiments of the disclosure, when the number of PDCCH blind detections in at least one search space is greater than a maximum number of blind detections, the number of PDCCH blind detections in the at least one search space may be reduced according to a certain preset rule until the number of PDCCH blind detections is less than or equal to the maximum number of blind detections, so that the terminal device can allocate the number of blind detections more reasonably, and reduce the complexity of channel estimation of the terminal device.

In an example, n and m are positive numbers greater than 0. The processor 310 may be configured to: reduce, after reducing the number of PDCCH blind detections in the n UE-specific search spaces according to a preset rule, the number of PDCCH blind detections in the m common search spaces if the reduced number of PDCCH blind detections in the at least one search space is greater than the maximum number of blind detections; or not reduce the number of PDCCH blind detections in the m common search spaces, if the reduced number of PDCCH blind detections in the at least one search space is less than or equal to the maximum number of blind detections.

In an example, the preset rule may include that: the processor 310 preferentially reduces the number of PDCCH blind detections corresponding to a low-level PDCCH AL in the n UE-specific search spaces.

In an example, the preset rule includes that: the processor 310 may sequentially reduce the number of PDCCH blind detections corresponding to different PDCCH ALs in the n UE-specific search spaces according to a first preset order, the first preset order being an ascending order of PDCCH ALs in the n UE-specific search spaces.

In an example, the preset rule may further include that: if a condition that the number of PDCCH blind detections in the at least one search space is less than or equal to the maximum number of blind detections is satisfied after lowering a first PDCCH AL in a first UE-specific search space in the n UE-specific search spaces, the processor 310 stops reducing the number of PDCCH blind detections in the at least one search space. The first UE-specific search space may be any UE-specific search space in the n UE-specific search spaces, and the first PDCCH AL may be any PDCCH AL in the n UE-specific search spaces.

In an example, the first preset order may further include: in a case that there are multiple UE-specific search spaces including the same PDCCH AL, an ascending order of search-space index values for the multiple UE-specific search spaces.

In an example, the preset rule may include that: the processor 310 preferentially reduces the number of PDCCH blind detections in a UE-specific search space with a small search-space index value in the n UE-specific search spaces.

In an example, the preset rule may further include that: in any UE-specific search space, the terminal device preferentially reduces the number of PDCCH blind detections corresponding to a low-level PDCCH AL.

In an example, the preset rule may specifically include that: the processor 310 sequentially reduces the number of PDCCH blind detections corresponding to different search spaces in the n UE-specific search spaces according to a second preset order, the second preset order being an ascending order of search-space index values of the n UE-specific search spaces.

In an example, the preset rule may further include that: if a condition that the number of PDCCH blind detections in the at least one search space is less than or equal to the maximum number of blind detections is satisfied after reducing the number of PDCCH blind detection times of a second PDCCH AL of a second UE-specific search space in then UE-specific search spaces, the processor 310 stops reducing the number of PDCCH blind detections in the at least one search space. The second UE-specific search space may be any UE-specific search space in the n UE-specific search spaces, and the second PDCCH AL may be any PDCCH AL in the n UE-specific search spaces.

In an example, the second preset order may further include an ascending order of PDCCH ALs in the same UE-specific search space.

In an example, the number of PDCCH blind detections reduced for different PDCCH ALs in the n UE-specific search spaces may be different.

In an example, the number of PDCCH blind detections reduced for each PDCCH AL in the n UE-specific search spaces may be preset.

In an example, the transceiver 320 may be configured to receive first indication information from a network device, the first indication information indicating the reduced number of PDCCH blind detections corresponding to each PDCCH AL in the n UE-specific search spaces.

In an example, the preset rule may include that: if time-frequency resources occupied by a PDCCH corresponding to a third PDCCH AL in the n UE-specific search spaces overlap with time-frequency resources occupied by a PDCCH corresponding to a fourth PDCCH AL, the processor 310 reduces the number of PDCCH blind detections corresponding to the third PDCCH AL and/or the fourth PDCCH AL to 0, the third PDCCH AL being lower than the fourth PDCCH AL.

In an example, the transceiver 320 may be configured to receive second indication information from the network device, the second indication information indicating to reduce the number of PDCCH blind detections corresponding to the third PDCCH AL and/or the fourth PDCCH AL to 0.

It is to be understood that the terminal device 300 according to the embodiment of the disclosure may correspond to the terminal device 200 in the embodiment of the disclosure, or may correspond to the subject for implementing the method 100 in the embodiment of the disclosure. Furthermore, the above and other operations and/or functions of each unit in the terminal device 300 are respectively intended to implement a corresponding process of the terminal device in each method in FIG. 1 and FIG. 2 and will not be repeated for the briefness.

According to the terminal device in the embodiments of the disclosure, when the number of PDCCH blind detections in at least one search space is greater than a maximum number of blind detections, the number of PDCCH blind detections in the at least one search space may be reduced according to a certain preset rule until the number of PDCCH blind detections is less than or equal to the maximum number of blind detections, so that the terminal device can allocate the number of blind detections more reasonably, and reduce the complexity of channel estimation of the terminal device.

It is to be noted that the above method embodiment in the disclosure may be applied to a processor, or implemented by a processor. The processor may be an integrated circuit chip with signal processing capabilities. In an implementation process, each step of the above method embodiment may be completed by using an integrated logic circuit of hardware in the processor or an instruction in a software form. The processor may be a universal processor, a Digital Signal Processor (DSP), an Application Specific Integrated Circuit (ASIC), a Field Programmable Gate Array (FPGA) or other programmable logic devices, a separate gate or a transistor logic device, a separate hardware component and the like. Various methods, steps, and logical block diagrams disclosed in the embodiments of the disclosure may be implemented or executed. The universal processor may be a microprocessor, or the processor may also be any conventional processor, etc. The steps of the method disclosed in combination with the embodiment of the disclosure may be directly embodied as a hardware decoding processor for execution and completion, or a combination of hardware and software modules in the decoding processor for execution and completion. The software module may be located in a mature storage medium in the art such as a Random Access Memory (RAM), a flash memory, a Read-Only Memory (ROM), a Programmable ROM (PROM) or an electrically erasable programmable memory, and a register. The storage medium is located in the memory. The processor reads information in the memory, and completes the steps of the above method in combination with hardware.

It can be understood that the memory in the embodiment of the disclosure may be a volatile memory or a non-volatile memory, or may include both volatile and non-volatile memories. The non-volatile memory may be a ROM, a PROM, an erasable PROM (EPROM), or an electrically EPROM (EEPROM) or a flash memory. The volatile memory may be a RAM, which is used as an external cache. By way of example, but not limitation, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memories of the system and method described herein are intended to include, but not limited to, these and any other suitable types of memory.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The foregoing storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure is to be subject to the scope of protection of the claims.

The invention claimed is:

1. A method for blind detection of a Physical Downlink Control Channel (PDCCH), implemented by a terminal device which has at least one search space comprising n UE-specific search spaces and m common search spaces,
when the number of PDCCH blind detections in the at least one search space of the terminal device is greater than a maximum number of blind detections, the number of PDCCH blind detections in the n UE-specific search spaces comprised in the at least one search space is reduced according to capability of the terminal device and a preset rule, the reduced number of PDCCH blind detections in the at least one search space being less than or equal to the maximum number of blind detections, where n and m are integers greater than or equal to 0, and n and m are not 0 at the same time; and
the method comprising:
performing, by the terminal device, a PDCCH blind detection in the at least one search space according to the reduced number of PDCCH blind detections in the at least one search space,
wherein when the number of Control Channel Elements (CCEs) required for channel estimation is greater than a maximum number of CCE channel estimations supported by the terminal device, the number of PDCCH blind detections in the n UE-specific search spaces comprised in the at least one search space is reduced until the number of CCEs required for channel estimation in the at least one search space is less than or equal to the maximum number of CCE channel estimations.

2. The method of claim 1, wherein:
the number of PDCCH blind detections in the m common search spaces is not reduced, n and m being integers greater than 0.

3. The method according to claim 1, wherein the preset rule comprises that:
compared with the number of PDCCH blind detections in a UE-specific search space with a small search-space index value in the n UE-specific search spaces, reduction in the number of PDCCH blind detections in a UE-specific search space with a large search-space index value in the n UE-specific search spaces is prioritized.

4. The method according to claim 3, wherein the preset rule further comprises that:
in any one of the n UE-specific search spaces, compared with the number of PDCCH blind detections corresponding to a high-level PDCCH Aggregation level (AL), reduction in the number of PDCCH blind detections corresponding to a low-level PDCCH AL is prioritized.

5. The method according to claim 3, wherein the preset rule specifically comprises that:
the number of PDCCH blind detections corresponding to different search spaces in the n UE-specific search spaces is reduced sequentially according to a second preset order, the second preset order being a descending order of search-space index values of the n UE-specific search spaces.

6. The method according to claim 5, wherein the second preset order further comprises:
an ascending order of PDCCH ALs in the same UE-specific search space.

7. The method of claim 1, wherein the preset rule comprises that:
compared with the number of PDCCH blind detections in a UE-specific search space with a large search-space index value in the n UE-specific search spaces, ensuring the number of PDCCH blind detections in a UE-specific search space with a small search-space index value in the n UE-specific search spaces is prioritized.

8. A terminal device, having at least one search space comprising n UE-specific search spaces and m common search spaces,
when the number of Physical Downlink Control Channel (PDCCH) blind detections in the at least one search space of the terminal device is greater than a maximum number of blind detections, the number of PDCCH blind detections in the n UE-specific search spaces comprised in the at least one search space is reduced according to capability of the terminal device and a preset rule, the reduced number of PDCCH blind detections in the at least one search space being less than or equal to the maximum number of blind detections, where n and m are integers greater than or equal to 0, and n and m are not 0 at the same time; and
the terminal device comprising:
a processor, and
a memory for storing instructions executable by the processor,
wherein the processor is configured to:
perform a PDCCH blind detection in the at least one search space according to the reduced number of PDCCH blind detections in the at least one search space, wherein when the number of Control Channel Elements (CCEs) required for channel estimation is greater than a maximum number of CCE channel estimations supported by the terminal device, the number of PDCCH blind detections in the n UE-specific search spaces comprised in the at least one search space is reduced until the number of CCEs required for channel estimation in the at least one search space is less than or equal to the maximum number of CCE channel estimations.

9. The terminal device of claim 8, wherein
the number of PDCCH blind detections in the m common search spaces is not reduced, n and m being integers greater than 0.

10. The terminal device according to claim 8, wherein the preset rule comprises that:
compared with the number of PDCCH blind detections in a UE-specific search space with a small search-space index value in the n UE-specific search spaces, reduction in the number of PDCCH blind detections in a UE-specific search space with a large search-space index value in the n UE-specific search spaces is prioritized.

11. The terminal device according to claim 10, wherein the preset rule specifically comprises that:
the number of PDCCH blind detections corresponding to different search spaces in the n UE-specific search spaces is reduced sequentially according to a second preset order, the second preset order being a descending order of search-space index values of the n UE-specific search spaces.

12. The terminal device according to claim 8, wherein the preset rule comprises that:
compared with the number of PDCCH blind detections in a UE-specific search space with a large search-space index value in the n UE-specific search spaces, ensuring the number of PDCCH blind detections in a UE-specific search space with a small search-space index value in the n UE-specific search spaces is prioritized.

13. The terminal device according to claim 8, wherein the preset rule comprises that:
when time-frequency resources occupied by a PDCCH corresponding to a third PDCCH Aggregation level (AL) in the n UE-specific search spaces overlap with time-frequency resources occupied by a PDCCH corresponding to a fourth PDCCH AL, at least one of the number of PDCCH blind detections corresponding to the third PDCCH AL and the number of PDCCH blind detections corresponding to the fourth PDCCH AL to 0 is reduced, the third PDCCH AL being lower than the fourth PDCCH AL.

14. The terminal device according to claim 13, further comprising a transceiver configured to:
receive second indication information from the network device, the second indication information indicating to reduce at least one of the number of PDCCH blind detections corresponding to the third PDCCH AL and the number of PDCCH blind detections corresponding to the fourth PDCCH AL to 0.

15. A network device, comprising:
a processor, and
a memory for storing instructions executable by the processor,
wherein the processor is configured to:
configure at least one search space comprising n UE-specific search spaces and m common search spaces for a terminal device communicated with the network device, wherein when the number of Physical Downlink Control Channel (PDCCH) blind detections in the at least one search space of the terminal device is greater than a maximum number of blind detections, the number of PDCCH blind detections in the n UE-specific search spaces comprised in the at least one search space is reduced according to capability of the terminal device and a preset rule, the reduced number of PDCCH blind detections in the at least one search space being less than or equal to the maximum number of blind detections, where n and m are integers greater than or equal to 0, and n and m are not 0 at the same time; and when the number of Control Channel Elements (CCEs) required for channel estimation is greater than a maximum number of CCE channel estimations supported by the terminal device, the number of PDCCH blind detections in the n UE-specific search spaces comprised in the at least one search space is reduced until the number of CCEs required for channel estimation in the at least one search space is less than or equal to the maximum number of CCE channel estimations.

16. The network device of claim 15, wherein
the number of PDCCH blind detections in the m common search spaces is not reduced, n and m being integers greater than 0.

17. The network device of claim 15, wherein the preset rule comprises that:
compared with the number of PDCCH blind detections in a UE-specific search space with a small search-space index value in the n UE-specific search spaces, reduction in the number of PDCCH blind detections in a UE-specific search space with a large search-space index value in the n UE-specific search spaces is prioritized.

18. The network device of claim 17, wherein the preset rule specifically comprises that:
the number of PDCCH blind detections corresponding to different search spaces in the n UE-specific search spaces is reduced sequentially according to a second preset order, the second preset order being a descending order of search-space index values of the n UE-specific search spaces.

19. The network device of claim 17, wherein the preset rule further comprises that:
in any one of the n UE-specific search spaces, compared with the number of PDCCH blind detections corresponding to a high-level PDCCH Aggregation level (AL) AL, reduction in the number of PDCCH blind detections corresponding to a low-level PDCCH AL is prioritized.

20. The network device of claim 15, wherein the preset rule comprises that:
compared with the number of PDCCH blind detections in a UE-specific search space with a large search-space index value in the n UE-specific search spaces, ensuring the number of PDCCH blind detections in a UE-specific search space with a small search-space index value in the n UE-specific search spaces is prioritized.

* * * * *